(12) United States Patent
Chen

(10) Patent No.: US 6,779,147 B2
(45) Date of Patent: Aug. 17, 2004

(54) METHOD AND APPARATUS FOR EFFICIENT USE OF COMMUNICATION RESOURCES IN A CDMA COMMUNICATION SYSTEM

(75) Inventor: Tao Chen, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 147 days.

(21) Appl. No.: 09/965,189

(22) Filed: Sep. 25, 2001

(65) Prior Publication Data

US 2003/0058831 A1 Mar. 27, 2003

(51) Int. Cl.[7] ............................. G08C 25/02; H04L 1/18
(52) U.S. Cl. ..................... 714/748; 370/468; 455/69; 455/88
(58) Field of Search ......................... 714/748, 749; 370/349, 476, 468; 455/69, 88, 62

(56) References Cited

U.S. PATENT DOCUMENTS

| | | | | |
|---|---|---|---|---|
| 5,706,428 A | * | 1/1998 | Boer et al. ................. | 370/342 |
| 6,272,123 B1 | * | 8/2001 | Abe ........................... | 370/342 |
| 6,414,938 B1 | * | 7/2002 | Corke et al. ............... | 370/231 |
| 6,496,496 B1 | * | 12/2002 | Ramakrishna et al. ...... | 370/342 |
| 6,553,003 B1 | * | 4/2003 | Chang ....................... | 370/342 |
| 2001/0034209 A1 | * | 10/2001 | Tong et al. ................ | 455/69 |
| 2003/0054848 A1 | * | 3/2003 | Kenney et al. ............. | 455/69 |

FOREIGN PATENT DOCUMENTS

| | | |
|---|---|---|
| WO | 0005911 | 2/2000 |
| WO | 0161943 A1 | 8/2001 |
| WO | 02062003 A1 | 8/2002 |

* cited by examiner

Primary Examiner—Guy J. Lamarre
(74) Attorney, Agent, or Firm—Philip R. Wadsworth; Thien T. Nguyen; S. Hossain Beladi

(57) ABSTRACT

A method and accompanying apparatus provides for efficient use of communication resources in a CDMA communication system by controlling a transmitting source (300) for transmitting a packet of data over a data frame at a first data rate and at a power level and re-transmitting the packet of data at a second data rate over at least two frames of data at the power level when a receiving destination fails to decode the packet of data. A data rate and power level selector (303) selects the second data rate lower than the first data rate. The data rate and power level selector (303) determines energy per bit of the packet of data at a ratio of the first and second data rates, and selects the second data rate from the ratio such that the determined energy per bit is at a minimum level.

20 Claims, 5 Drawing Sheets

METHOD AND APPARATUS FOR EFFICIENT USE OF COMMUNICATION RESOURCES IN A CDMA COMMUNICATION SYSTEM

FIELD

The present invention relates generally to the field of communications, and more particularly to communications in a cellular communication system.

BACKGROUND

In code division multiple access (CDMA) communication systems, unnecessary and excessive transmission by a user may cause interference for other users in addition to reducing the system capacity. The communication system may provide communication services that include wireless radio transmission of digitized speech, still or moving images, text messages and other types of data. An encoder in a transmitter of the communication system may receive a packet of data for encoding. Each data packet may be transmitted in a time frame. After transmitting data in each frame, the receiving destination may make a positive or negative acknowledgment of decoding the data packet. If the data packet is decoded properly, a positive acknowledgement is transmitted to the transmitting source. If the data packet is not decoded properly, a negative acknowledgement is transmitted to the transmitting source. When a negative acknowledgment is received, the transmitting source retransmits the failed data packet. The retransmission may be performed at a higher power level than the initial transmission. The increase in the power level from the initial transmission may allow the receiving destination to overcome the interference for proper decoding of the data packet. However, higher power level at the retransmission increases interference for other users. Such interference may prevent decoding of other data packets transmitted by other users. As such, increasing power level reduces system throughput and capacity and leads to an inefficient use of the communication resources.

To this end as well as others, there is a need for a method and apparatus for efficient use of communication resources in a communication system.

SUMMARY

A method and apparatus provides for efficient use of communication resources in a CDMA communication system when a receiving destination fails to decode the packet of data. A transmitting source may be controlled for transmitting a packet of data over a data frame at a first data rate and at a power level. The transmitting source is further controlled by re-transmitting the failed packet of data at a second data rate over at least two frames of data at the initially transmitted power level. A data rate and power level selector selects the second data rate lower than the first data rate. The data rate and power level selector determines energy per bit of the packet of data at a ratio of the first and second data rates, and selects the second data rate from the ratio such that the determined energy per bit is at a minimum level.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT(S)

Various embodiments of the invention may be incorporated in a wireless communication system operating in accordance with the code division multiple access (CDMA) technique which has been disclosed and described in various standards published by the Telecommunication Industry Association (TIA) and other standards organizations. Such standards include the TIA/EIA-95 standard, TJA/EIA-IS-2000 standard, IMT-2000 standard, UMTS and WCDMA standard, all incorporated by reference herein. A system for communication of data is also detailed in the "TIA/EIA/IS-856 cdma2000 High Rate Packet Data Air Interface Specification," incorporated by reference herein. A copy of the standards may be obtained by accessing the world wide web, or by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Generally stated, a novel and improved method and an accompanying apparatus provide for efficient use of communication resources in a CDMA communication system. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

Figure 1:
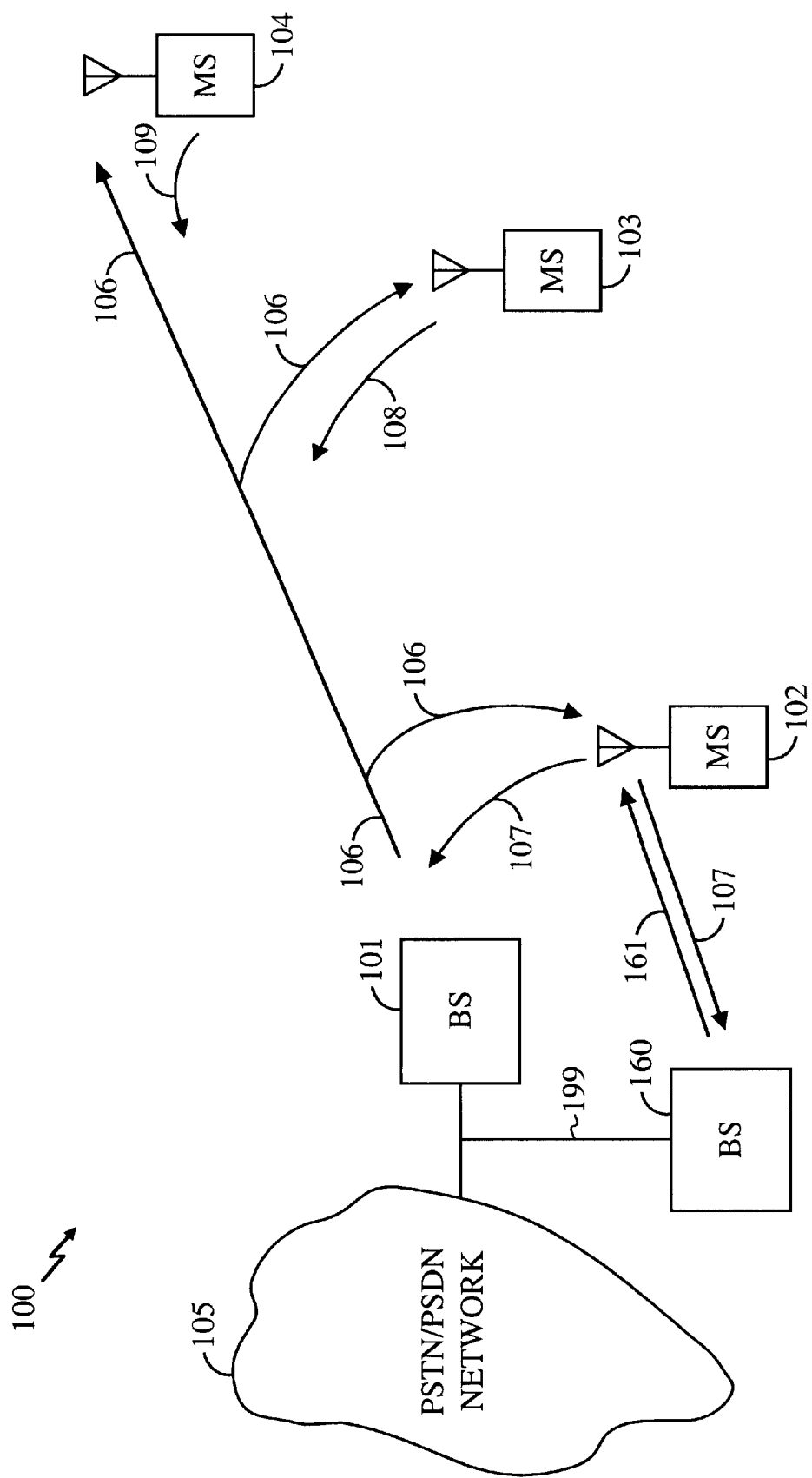
FIG. 1 illustrates a communication system 100 capable of operating in accordance with various embodiments of the invention.

FIG. 1 illustrates a general block diagram of a communication system 100 capable of operating in accordance with any of the code division multiple access (CDMA) communication system standards while incorporating various embodiments of the invention. Communication system 100 may be for communications of voice, data or both. Generally, communication system 100 includes a base station 101 that provides communication links between a number of mobile stations, such as mobile stations 102–104, and between the mobile stations 102–104 and a public switch telephone and data network 105. The mobile stations in FIG. 1 may be referred to as data access terminals and the base station as data access network without departing from the main scope and various advantages of the invention. Base station 101 may include a number of components, such as a base station controller and a base transceiver system. For simplicity, such components are not shown. Base station 101 may also be in communication with other base stations, for example base station 160. A mobile switching center (not shown) may control various operating aspects of the communication system 100 and in relation to a back-haul 199 between network 105 and base stations 101 and 160.

Base station 101 communicates with each mobile station that is in its coverage area via a forward link signal. The forward link signals targeted for mobile stations 102–104 may be summed to form a forward link signal 106 and transmitted from base station 101. Each of the mobile stations 102–104 receiving forward link signal 106 decodes the forward link signal 106 to extract the information that is targeted for its user. Base station 160 may also communicate with the mobile stations that are in its coverage area via a forward link signal. Mobile stations 102–104 communicate with base stations 101 and 160 via corresponding reverse links. Each reverse link is maintained by a reverse link signal, such as reverse link signals 107–109 for respectively mobile stations 102–104.

In a soft handoff situation, base stations 101 and 160 may be communicating to a common mobile station. For example, mobile station 102 may be in close proximity of base stations 101 and 160, which can maintain communications with both base stations 101 and 160. On the forward link, base station 101 transmits on forward link signal 106, and base station 160 on the forward link signal 161. On the reverse link, mobile station 102 transmits on reverse link signal 107 to be received by both base stations 101 and 160. For transmitting a data packet to mobile station 102 in soft handoff, base stations 101 and 160 transmit identical information synchronously to the mobile station 102. On the reverse link, both base stations 101 and 160 may attempt to decode the traffic data transmission from the mobile station 102. The base stations 101 and 160 may also transmit a pilot channel on the forward link to assist the mobile stations in decoding various channels on the forward link.

Figure 2:
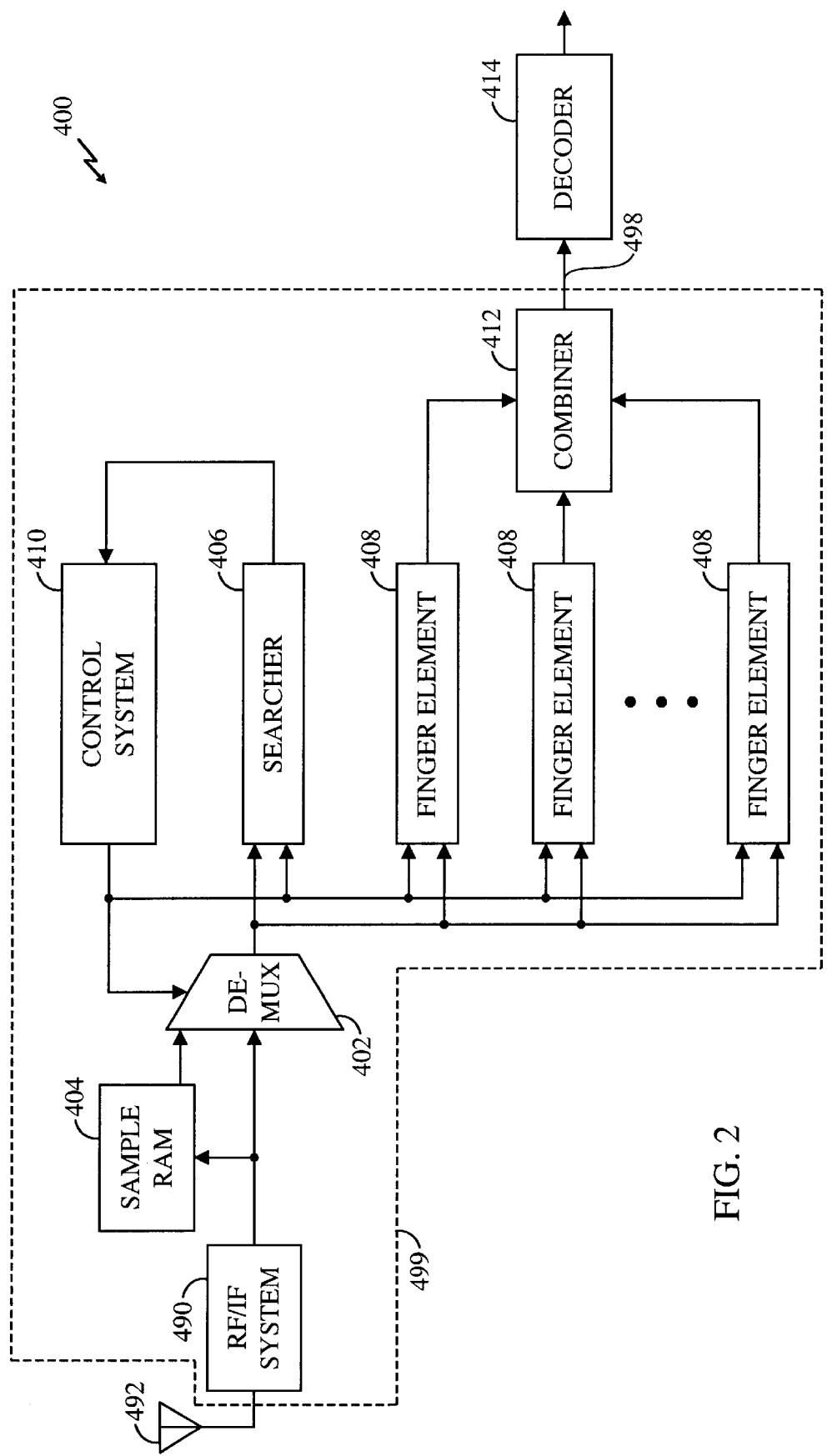
FIG. 2 illustrates a communication system receiver for receiving and decoding received data.

FIG. 2 illustrates a block diagram of a receiver 400 used for processing and demodulating the received CDMA signal. Receiver 400 includes an antenna system 492 and a receive processing unit 499 to process the received signal to produce a demodulated combined signal 498 to a decoder 414 for decoding the received information. Receiver 400 may be used for decoding the information on reverse and forward links signals. Receive (Rx) samples may be stored in SAMPLE RAM 404. Receive samples are generated by a radio frequency/intermediate frequency (RF/IF) system 490 and an antenna system 492. Antenna system 492 receives an RF signal, and passes the RF signal to RF/IF system 490. RF/IF system 490 may be any conventional RF/IF receiver. The received RF signals are filtered, down-converted and digitized to form Rx samples at base band frequencies. The samples are supplied to a demultiplexer (demux) 402. The output of demux 402 is supplied to a searcher unit 406 and finger elements 408. A control unit 410 is coupled thereto, which receives the output of searcher 406 and outputs to demux 402 and all finger elements 408. A combiner 412 couples a decoder 414 to finger elements 408. Control unit 410 may be a microprocessor controlled by software, and may be located on the same integrated circuit or on a separate integrated circuit. The decoding function in decoder 414 may be in accordance with soft-output Viterbi algorithm concatenated or a turbo decoder.

During operation, receive samples are supplied to demux 402. Demux 402 supplies the samples to searcher unit 406 and finger elements 408. Control unit 410 configures finger elements 408 to perform demodulation of the received signal at different time offsets based on search results from searcher unit 406. The results of the demodulation are combined and passed to decoder 414. Decoder 414 decodes the data and outputs the decoded data. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art.

Figure 3:
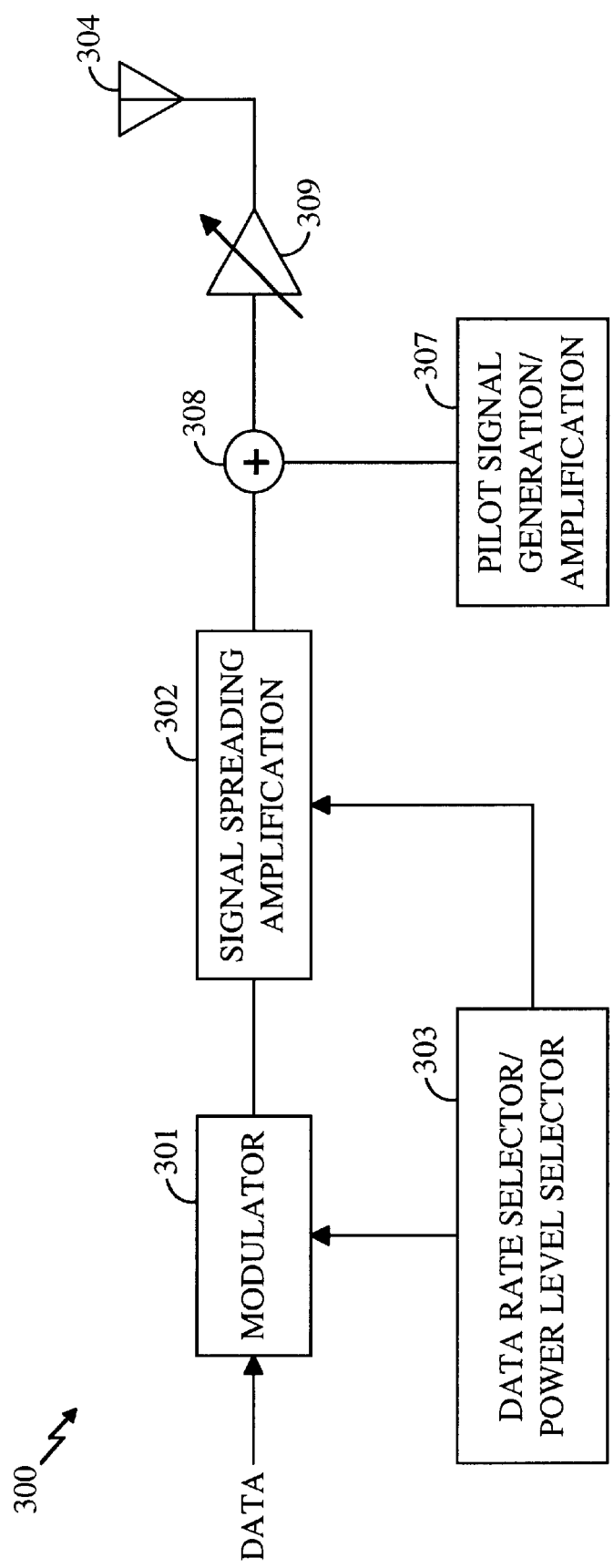
FIG. 3 illustrates a communication system transmitter for transmitting data over frames of data in accordance with various aspects of the invention.

FIG. 3 illustrates a block diagram of a transmitter 300 for incorporating various aspects of the invention. A traffic channel data for transmission is inputted to a modulator 301 for modulation. The modulation may be according to any of the commonly known modulation techniques such as QAM, PSK or BPSK. The data is encoded at a data rate in modulator 301. The data rate may be selected by a data rate and power level selector 303. The data rate selection may be based on feedback information from a receiving destination. The information may include a data rate request and report of a channel condition at the receiver. The data rate and power level selector 303 accordingly selects the data rate in modulator 301. The output of modulator 301 passes through a signal spreading operation and amplified in a block 302 for transmission from an antenna 304. A pilot signal is also generated in a block 307. The pilot signal is amplified to an appropriate level in block 307. The pilot signal power level may be in accordance with the channel condition at a receiving end. The pilot signal is combined with the traffic channel signal in a combiner 308. The combined signal may be amplified in an amplifier 309 and transmitted from antenna 304. The data rate and power level selector 303 also selects a power level for the amplification level of the transmitted signal in accordance with the feedback information. The combination of the selected data rate and the power level allows proper decoding of the transmitted data at the receiving destination. After each transmission of a frame of data, the receiving destination sends an acknowledgment to the transmitting source. The acknowledgment is positive if the frame of data is decoded properly. If the frame of data is not decoded properly, a negative acknowledgment is transmitted.

In accordance with various aspects of the invention, in a communication system 100, a transmitter 300 transmits a packet of data over a data frame at a first data rate and at a power level from a transmitting source such as mobile station 102. A receiving destination such as base station 101 or 160 receives the packet of data. When the receiving destination fails to decode the received packet of data, the receiving destination transmits a negative acknowledgment to the transmitting source. The transmitting source retransmits the packet of data at a second data rate over at least two frames of data at the initial power level. The second data rate in accordance with one embodiment is lower than the first data rate. As such, the communication resources are used efficiently since the retransmission is at the power level of the initial transmission. The number of frames used in the retransmission for transmitting the data frames depends on the ratio of the first and second data rates. When the second data rate is one half of the first data rate, the retransmission may be over two frames of data to retransmit every data bit of the packet of data. When the second data rate is one third of the first data rate, the retransmission may be over three frames of data to retransmit every data bit of the packet of data.

Figure 4:
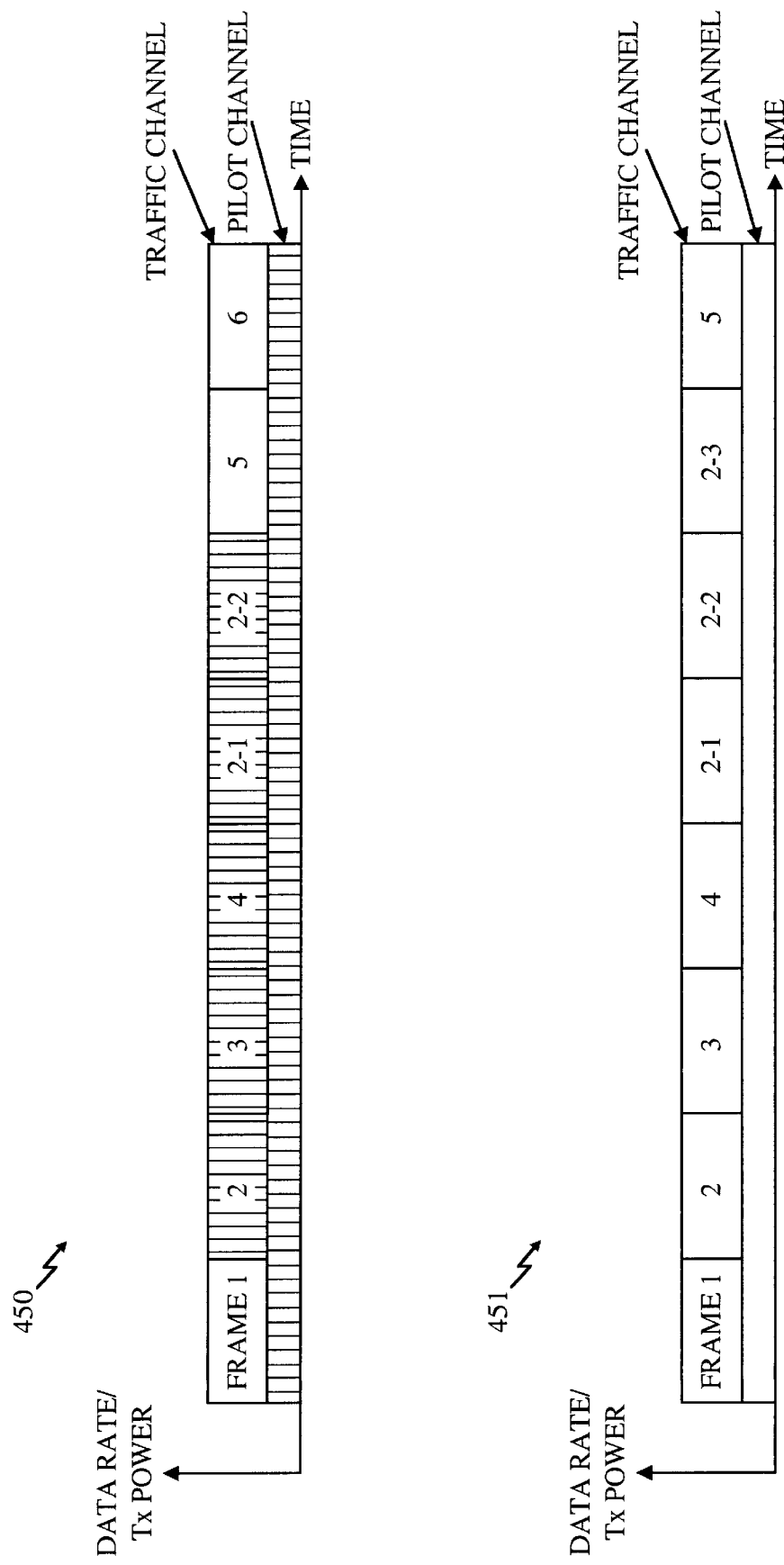
FIG. 4 illustrates transmission and retransmission of a packet of data in accordance with various aspects of the invention.

Referring to FIG. 4, two examples the frames 450 and 451 for transmitting a packet of data in accordance with various embodiments of the invention are shown. In the first example 450, the first transmission of frames 1–6, and retransmission of frame 2 are shown. The retransmission of frame 2 takes place, for example, due to receiving a negative acknowledgment from a receiving destination. The retransmission of frame 2 takes place over two frames, as shown. The data rate of the packet of data during retransmission is one half of the data rate used for the initial transmission of data frame 2. Therefore, the retransmission of data frame 2 is over at least two data frames. Although the power level of each frame has remained the same, the average energy per information bit has approximately doubled in accordance with an aspect of the invention. The receiving destination, as such, is more capable of decoding the packet of data successfully due to the increase in the average energy per bit in the packet of data. In the second example 451, the retransmission is over three frames of data. The data rate during the retransmission is one third of the data rate used during the initial transmission. The power level during retransmission is approximately the same as the power level used for the initial transmission. In this example, the average energy per bit in the packet of data is three times the average energy per bit of the packet of data during the initial transmission. As such, the receiving destination is more capable to decode the data successfully. Since the power level is kept the same in accordance with various aspects of the invention, no additional interference may be created. Therefore, the communication resources are used more efficiently.

In accordance with another embodiment, the second data rate is selected from a predetermined group of data rates for transmission. Depending on the power level of the initial transmission, the group of data rates for transmission has at least one data rate for the retransmission that allows the efficient use of the communication resources. To determine the data rate for the retransmission, the energy per bit of the packet of data at a ratio of the first data rate and a possible second data rate is determined. The second data rate is selected such that, at the power level of the first transmission, the determined energy per bit is at a minimum level.

Figure 5:
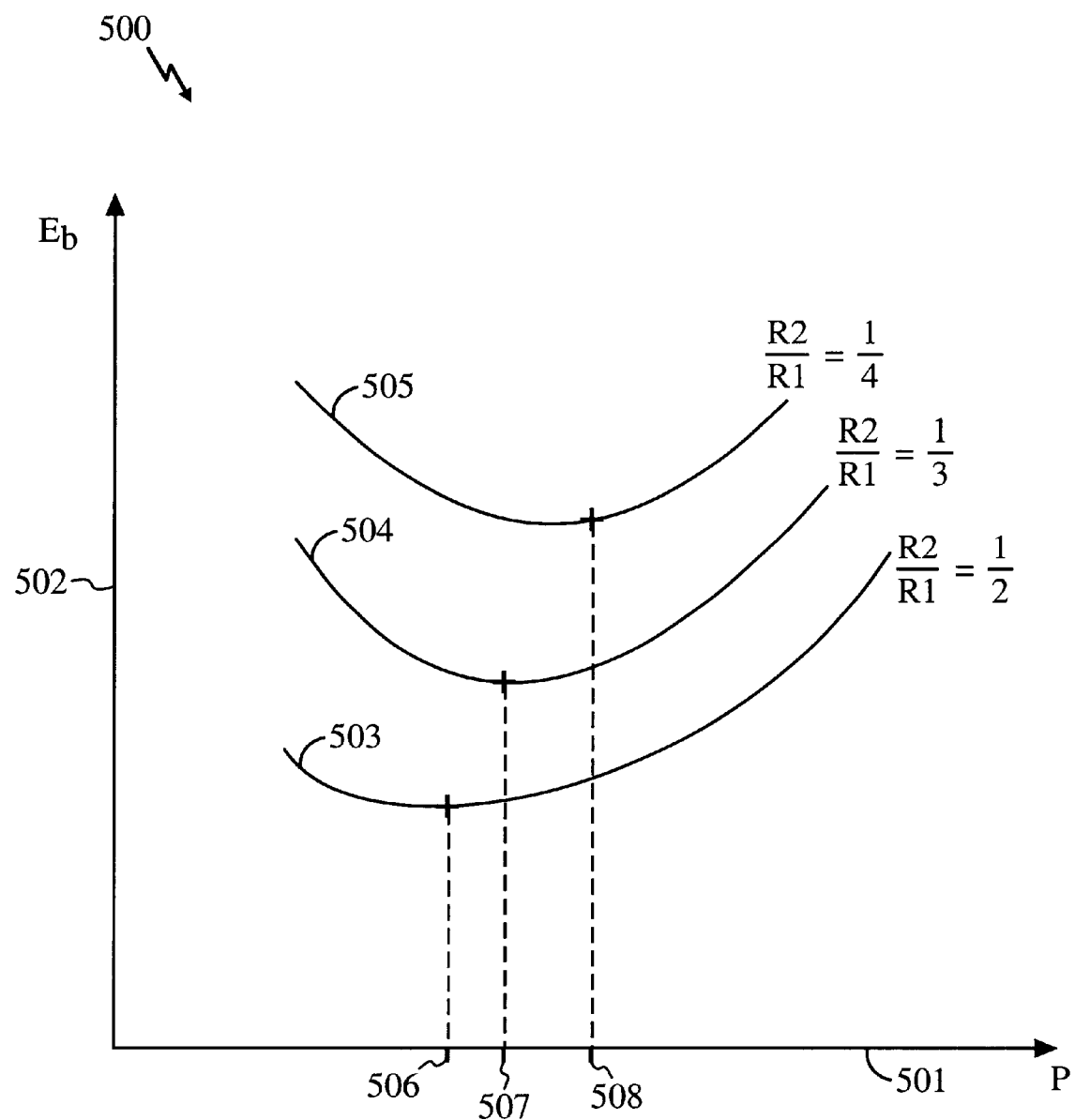
FIG. 5 illustrates a graph of energy per bit versus transmit power level for selecting a data rate ratio of an initial transmission and a subsequent transmission such that the average energy per bit is at a minimum level in accordance with various aspects of the invention.

Referring to FIG. 5, a graph 500 illustrates the selection of the second data rate based on the power level of the transmission. The horizontal axis "P" 501 indicates a range of power levels that may be used for the initial transmission. The vertical axis $E_b$ 502 indicates the energy per bit used for a successful transmission of the data packet to achieve a final frame error rate after the retransmission is completed. The curve traces 503–505 shows the power level and the energy per bit for different ratios of the first and second data rates. The curve traces 503–505 are exemplary traces and are used for illustration. The curve traces 503–505 drawn for a system and a channel condition may differ substantially from the shown traces. The relative location of the traces on the graph may also differ substantially depending on several factors including channel condition, modulation scheme and coding scheme used in the system. Under any one condition, the curve traces 503–505 have at least one minimum energy per bit level. For example, for the curve trace 503 corresponding to the data rate ratio of one half, the minimum energy per bit level corresponds to a power level 506. Similarly, for the curve trace 504 corresponding to the data rate ratio of one third, the minimum energy per bit level corresponds to a power level 507. Similarly, for the curve trace 505 corresponding to the data rate ratio of one forth, the minimum energy per bit level corresponds to a power level 508.

The power levels of the initial transmission and subsequent retransmission are kept at approximately the same level in accordance with various aspects of the invention. If the power level of the initial transmission is closer to, for example, power level 506, the second data rate on the retransmission is selected at one half of the data rate of the initial transmission. The retransmission is also at the same power level as the initial transmission. Therefore, the combined energy per bit for the complete transmission is at the minimum level. As such, the communication resources are used more efficiently. If the power level of the transmission is closer to, for example, power level 507, the second data rate on the retransmission is selected at one third of the data rate of the initial transmission. Therefore, the combined energy per bit for the complete transmission is at the minimum level. As such, the communication resources are used more efficiently. If the power level of the transmission is closer to, for example, power level 508, the second data rate on the retransmission is selected at one fourth of the data rate of the initial transmission. Therefore, the combined energy per bit for the complete transmission is at the minimum level. As such, the communication resources are used more efficiently. The data rate and power selector 303 may select the data rate of the retransmission based on the power level of transmission corresponding to a minimum energy per bit as represented, for example, curve traces 503–505. As such, the total energy per bit for a successful transmission of a packet of data is minimized.

To determine the curve traces 503–505, the target frame error rate (FER) of the complete transmission may need to be known. The target FER after a retransmission is the FER of the initial transmission (FER 1) multiplied by the FER of the second transmission FER2 (i.e. FER=FER1*FER2). If the retransmission is delayed by a substantial amount of time, the initial and subsequent retransmission may be treated as independent transmissions. The communication system 100 may be also transmitting a pilot channel in accordance with the standards incorporated by reference herein. Therefore, the FER of a transmission may depend on a ratio of the traffic channel and pilot channel power levels. Once the target FER, the transmission power level, pilot channel power, and the possible ratios of the data rates of the initial transmission and retransmission are known, the FER2 may be determined. From FER2, the total energy per bit may be determined for the combined initial and retransmission of the packet of data. The curve traces shown in graph 500 may be detailed by adjusting the power level while keeping the data rate ratio and target FER constant. The process may be repeated for different data rate ratios. The minimum energy per bit locations on the curve traces may be identified for different data rate ratios for a target FER. If a different target FER is desired, the process may be repeated for different values of the FER target. The possible curve traces for a channel condition may be determined by data rate and power level selector 303 such that the data rate for the retransmission may be determined in time for the retransmission to take place without delay or substantial delay. Use of a processor may be appropriate in one embodiment.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

a. The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

b. The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. In a communication system, a method comprising:
   transmitting a packet of data over a data frame at a first data rate and at a power level from a transmitting source;
   receiving said packet of data at a receiving destination;
   failing to decode said packet of data;
   transmitting a negative acknowledgment to said transmitting source; and re-transmitting said packet of data at a second data rate over at least two frames of data at said power level;
   determining energy per bit of said packet of data at a ratio of said first and second data rates;
   determining said second data rate from said ratio such that said determined energy per bit is at a minimum level.

2. The method as recited in claim 1 wherein said second data rate is lower than said first data rate.

3. The method as recited in claim 1 further comprising:
   selecting said second data rate from a predetermined group of data rates for transmission.

4. The method as recited in claim 1 wherein a number of said at least two frames of data depends on a ratio of said first and second data rates.

5. In a communication system, an apparatus comprising:
   a transmitting source for transmitting a packet of data over a data frame at a first data rate and at a power level; and
   a data rate and power level selector coupled to said transmitting source for re-transmitting said packet of data at a second data rate over at least two frames of data at said power level when a receiving destination fails to decode said packet of data;
   wherein said data rate and power level selector determines energy per bit of said packet of data at a ratio of said first and second data rates, and selects said second data rate from said ratio such that said determined energy per bit is at a minimum level.

6. The apparatus as recited in claim 5 wherein said data rate and power level selector selects said second data rate at a rate lower than said first data rate.

7. The apparatus as recited in claim 5 wherein said data rate and power level selector selects said second data rate from a predetermined group of data rates for transmission.

8. The apparatus as recited in claim 5 wherein said data rate and power level selector selects a number of said at least two frames of data based on a ratio of said first and second data rates.

9. A communication system comprising:
   a transmitting source for transmitting a packet of data over a data frame at a first data rate and at a power level;
   a receiving destination for receiving said packet of data, and for transmitting a negative acknowledgment to said transmitting source when said receiving destination fails to decode said packet of data; and
   wherein said transmitting source is configured for re-transmitting said packet of data at a second data rate over at least two frames of data at said power level;
   a data rate and power level selector for determining energy per bit of said packet of data at a ratio of said first and second data rates, selecting said second data rate from said ratio such that said determined energy per bit is at a minimum level.

10. The system as recited in claim 9 wherein said transmitting source includes a data rate and power level selector for selecting said second data rate lower than said first data rate.

11. The system as recited in claim 9 further comprising:
    a data rate and power level selector for selecting said second data rate from a predetermined group of data rates for transmission.

12. The system as recited in claim 9 wherein a number of said at least two frames of data depends on a ratio of said first and second data rates.

13. A processor for use in a communication system comprising:
    a data rate and power level selector for controlling a transmitting source for transmitting a packet of data over a data frame at a first data rate and at a power level from said transmitting source and re-transmitting said packet of data at a second data rate over at least two frames of data at said power level when a receiving destination fails to decode said packet of data;
    wherein said data rate and power level selector is configured for determining energy per bit of said packet of data at a ratio of said first and second data rates, and selecting said second data rate from said ratio such that said determined energy per bit is at a minimum level.

14. The processor as recited in claim 13 wherein said data rate and power level selector is configured for selecting said second data rate lower than said first data rate.

15. The processor as recited in claim 13 wherein said data rate and power level selector is configured for selecting said second data rate from a predetermined group of data rates for transmission.

16. The processor as recited in claim 13 wherein said data rate and power level selector is configured for selecting a number of said at least two frames of data based on a ratio of said first and second data rates.

17. An apparatus for use in a communication system comprising:

means for a data rate and power level selector for controlling a transmitting source for transmitting a packet of data over a data frame at a first data rate and at a power level from said transmitting source and re-transmitting said packet of data at a second data rate over at least two frames of data at said power level when a receiving destination fails to decode said packet of data, wherein said means for said data rate and power level selector is coupled to said transmitting source;

wherein said means for said data rate and power level selector is configured for determining energy per bit of said packet of data at a ratio of said first and second data rates, and selecting said second data rate from said ratio such that said determined energy per bit is at a minimum level.

18. The apparatus as recited in claim 17 wherein said means for said data rate and power level selector is configured for selecting said second data rate lower than said first data rate.

19. The apparatus as recited in claim 17 wherein said means for said data rate and power level selector is configured for selecting said second data rate from a predetermined group of data rates for transmission.

20. The apparatus as recited in claim 17 wherein said means for said data rate and power level selector is configured for selecting a number of said at least two frames of data based on a ratio of said first and second data rates.

* * * * *